United States Patent Office 2,969,899
Patented Jan. 31, 1961

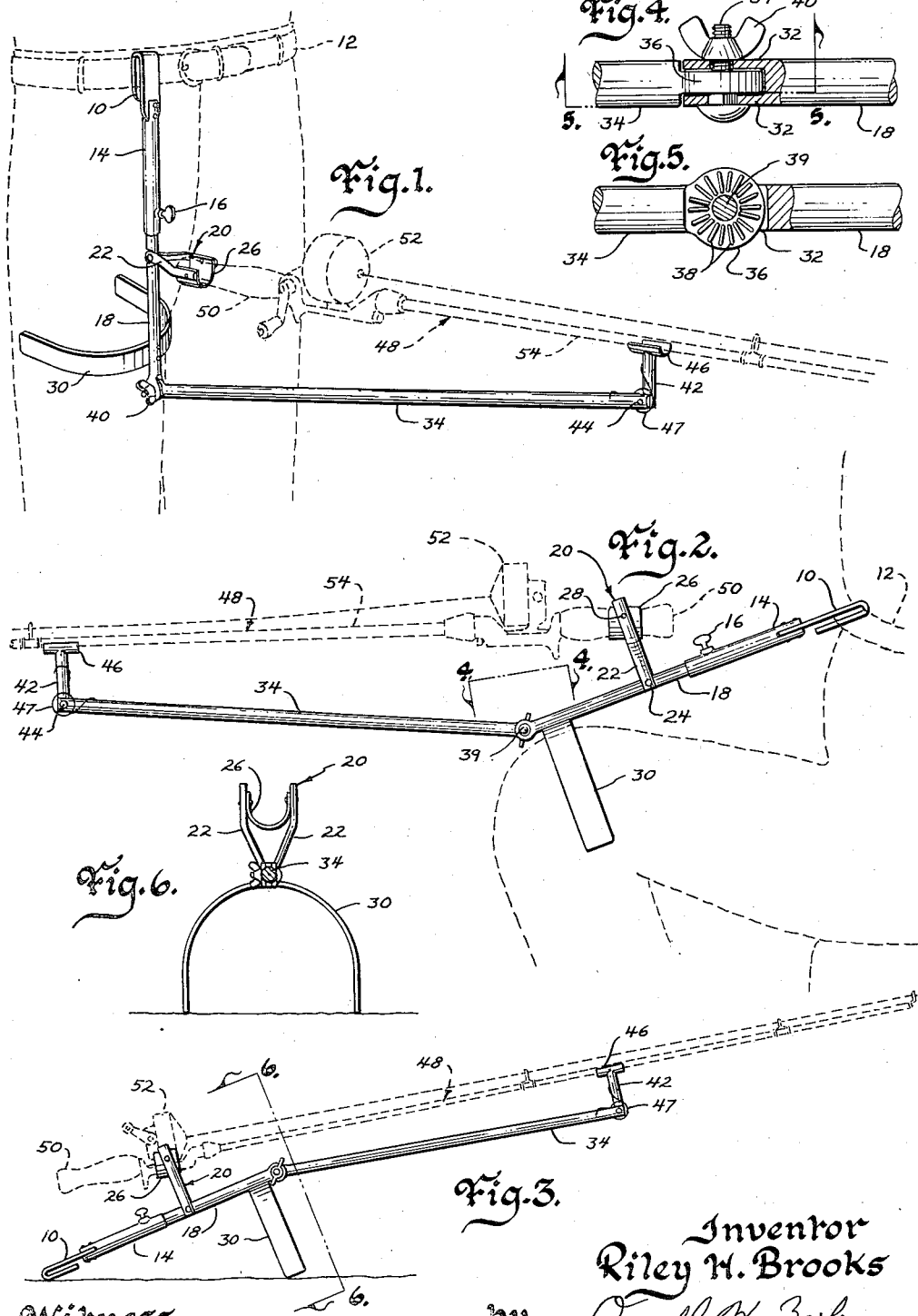

2,969,899
HOLDING DEVICE FOR FISHING RODS
Riley H. Brooks, 1522 1st St., Webster City, Iowa
Filed July 23, 1959, Ser. No. 829,022
5 Claims. (Cl. 224—5)

My invention relates to fishing equipment and more particularly to a device for holding a fishing rod.

The holding of a fishing rod while baiting a hook or removing a fish from a hook is very cumbersome. Many other chores during the fishing operation require the use of both hands and as a result, the rod, which is usually clamped between the arm and the body in such instances, sometimes falls into the water or sand.

Therefore, the principal object of my invention is to provide a holding device for fishing rods that will enable the fisherman to hold the rod and still have both hands free for other purposes.

A further object of my invention is to provide a holding device for fishing rods that can be used if the fisherman is sitting or standing.

A still further object of my invention is to provide a holding device for fishing rods that will properly secure a fishing rod on the ground if so desired.

A still further object of my invention is to provide a holding device for fishing rods that will properly secure the fishing rod but which will also give the fisherman quick and easy access thereto.

A still further object of my invention is to provide a holding device for fishing rods that will permit the fisherman to be made aware when a fish strikes.

A still further object of my invention is to provide a fishing rod holding device which people of different size and stature can easily use.

A still further object of my invention is to provide a fishing rod holding device that is economical of manufacture, durable in use and refined in appearance.

These and other objects will be apparent to those skilled in the art.

My invention consists in the construction, arrangements and combination, of the various parts of the device, whereby the objects contemplated are attained as hereinafter more fully set forth, specifically pointed out in my claims, and illustrated in the accompanying drawings, in which:

Fig. 1 is a perspective view of my device as used by a fisherman in a standing position;

Fig. 2 is a side elevational view of my device as used by a fisherman in a sitting position;

Fig. 3 is a side elevational view of my device while resting on the ground surface;

Fig. 4 is a partial sectional view of my device taken on line 4—4 of Fig. 2;

Fig. 5 is a sectional view of my device taken on line 5—5 of Fig. 4; and

Fig. 6 is a sectional view of my device taken on line 6—6 of Fig. 3.

I have used the numeral 10 to designate a flattened hook which is adapted to fit over a fisherman's belt 12 at times. A hollow tube 14 is secured by one of its ends to hook 10 and is in substantial alignment therewith. A set screw 16 is threadably mounted on tube 14 and is in communication with the interior thereof to selectively hold rod 18 which telescopically extends from the end of tube 14 opposite the hook 10.

A Y-shaped yoke 20 extends perpendicularly from rod 18 in a direction that is also perpendicular to the plane of flattened hook 10. Yoke 20 is comprised of upwardly extending arms 22 which are secured by their lower ends to rod 18 by means of rivet 24. A U-shaped cradle 26 is pivotally mounted between the upper ends of arms 22 by pins 28 and has its upper portion open and unobstructed. An inverted U-shaped leg band 30 is secured to rod 18 near the end thereof opposite to tube 14 and extends away from rod 18 in a direction opposite to that of yoke 20. Leg band 30 should be of bendable aluminum or the like so as to be capable of being bent to conform to the size of the fisherman's leg.

The end of rod 18 opposite to tube 14 terminates in two parallel spaced apart ears 32. One end of rod 34 terminates in an ear 36 which is pivotally received between the ears 32 on rod 18. Ear 36 has a plurality of radial splines 38 formed thereon on both of its sides as shown in Figs. 4 and 5. A threaded pin 39 extends through registering holes in ears 32 and 36 and wing nut 40 completes the pivotal connection between rods 18 and 34. Ears 32 and 36 are so positioned that rod 34 can pivot in the same plane as cradle 26. With a proper amount of tension being exerted on the ears by pin 39 and nut 40, the two rods can be moved to different relative positions and the splines 38 will frictionally hold the two rods in any desired position. This arrangement avoids the necessity of manipulating wing nut 40 for each adjusted position.

A T-shaped bracket 42 is pivotally secured to the outer free end of rod 34 by pin 44. The upper portion of bracket 42 is comprised of an elongated U-shaped portion 46 which is open at its top and which is in alignment with rod 34. Bracket 42 is yieldingly held in a substantially perpendicular position with respect to rod 34 by a light coil spring 47 whose respective ends engage the rod and bracket. Bracket 42 extends in an upwardly direction in the same manner that yoke 20 extends away from rod 18.

A fishing rod 48 with handle 50, reel 52 and rod portion 54 has been shown in dotted lines in Figs. 1, 2 and 3.

The normal operation of my device is as follows: If the fisherman is standing, as would be the case in many fishing situations, the hook 10 is placed over the belt 12 to permit tube 14 and rod 18 to extend down the forward portion of one of the fisherman's legs. The over-all length of tube 14 and rod 18 can be adjusted by telescopically moving rod 18 into or out of tube 14 by means of screw 16, so that the leg band 30 will strike the uppermost portion of the fisherman's leg. It is very important that the leg band be in that position because my device, when so worn, is not affected by the fisherman's walking. The band 30 may be bent to firmly grip the fisherman's leg.

Rod 34 is then pivoted upwardly to a substantially horizontal position and is held in this position without further adjustment by splines 38 in the manner described above. Gravity will normally have kept cradle 26 in its usual horizontal position and the handle 50 of fishing rod 48 can be placed in the cradle as shown in Fig. 1. The rod portion 54 is then placed in the top portion 46 of bracket 42 and the weight of the rod will overcome the tension in spring 47 so that the bracket will pivot and align itself with the rod portion. The fisherman can then have both hands free to handle bait or fish, light a cigarette or any other task requiring the use of both hands. The contact that the hook 10 and leg band 30 make with the fisherman will let him know instantly when a fish strikes the line on rod 48. Since cradle 26 and portion 46 on bracket 42 are open at the top, the fisherman can remove the rod 48 from my device without delay in order to land the fish. Furthermore, the fisherman can walk from place to place, as in a trout stream, without removing the rod from my device and without my device intereferring with the fisherman's walking.

If it is desired to use my device while sitting, rod 34 is pivoted to the position with respect to rod 18 as shown in Fig. 2 and the leg band 30 can be moved slightly closer to the fisherman's knee. Cradle 26 will always be in the proper position to receive rod 48 and the bracket 42 will always move into alignment with the rod. My device can support a fishing rod on a ground surface as shown in Fig. 3 by making further adjustments in the manner described above.

Thus, from the foregoing, it is seen that my device will accomplish at least all of its stated objectives.

Some changes may be made in the construction and arrangement of my holding device for fishing rods without departing from the real spirit and purpose of my invention, and it is my intention to cover by my claims, and modified forms of structure or use of mechanical equivalents which may be reasonably included within their scope.

I claim:

1. In a holding device for fishing rods, a first rod normally disposed in a vertical position, a belt-receiving hook means secured to the upper end of said first rod, a second rod pivotally connected to the lower end of said first rod a U-shaped leg band secured to the lower portion of said first rod, and supporting means on said first and second rods for receiving portions of a fishing rod.

2. In a holding device for fishing rods, a first rod normally disposed in a vertical position, a belt-receiving hook means secured to the upper end of said first rod, means on said first rod for adjusting its length, a second rod pivotally connected to the lower end of said first rod, a U-shaped leg band secured to the lower portion of said first rod, and supporting means on said first and second rods for receiving portions of a fishing rod.

3. In a holding device for fishing rods, a first rod normally disposed in a vertical position, a belt-receiving hook means secured to the upper end of said first rod, a second rod pivotally connected to the lower end of said first rod, a U-shaped leg band secured to the lower portion of said first rod, a yoke means on said first rod, a U-shaped cradle having an open top freely pivotally secured to said yoke means and being capable of receiving a portion of a fishing rod therein, and a bracket having an open top portion for freely supporting a portion of a fishing rod on said second rod at a point remote from said first rod.

4. In a holding device for fishing rods, a first rod normally disposed in a vertical position, a belt-receiving hook means secured to the upper end of said first rod, a second rod pivotally connected to the lower end of said first rod, a yoke means on said first rod, a U-shaped cradle having an open top freely pivotally secured to said yoke means and being capable of receiving a portion of a fishing rod therein, and a bracket having an open top portion for freely supporting a portion of a fishing rod on said second rod at a point remote from said first rod.

5. In a holding device for fishing rods, a first rod normally disposed in a vertical position, a belt-receiving hook means secured to the upper end of said first rod, a second rod pivotally and frictionally connected to the lower end of said first rod, a U-shaped leg band secured to the lower portion of said first rod, and supporting means on said first and second rods for receiving portions of a fishing rod.

References Cited in the file of this patent

UNITED STATES PATENTS

| | | |
|---|---|---|
| 1,091,491 | Ebur | Mar. 31, 1914 |
| 2,075,779 | Johnson et al. | Mar. 30, 1937 |
| 2,537,456 | Goss | Jan. 9, 1951 |
| 2,576,624 | Miller | Nov. 27, 1951 |
| 2,742,210 | Bortz et al. | Apr. 17, 1956 |